(12) United States Patent
Zaid et al.

(10) Patent No.: US 9,086,470 B2
(45) Date of Patent: Jul. 21, 2015

(54) METHOD AND APPARATUS FOR MAPPING BUILDINGS

(71) Applicants: Jacob Zaid, Haifa (IL); Shalom Daskal, Ramat Efal (IL)

(72) Inventors: Jacob Zaid, Haifa (IL); Shalom Daskal, Ramat Efal (IL)

(73) Assignee: Shalom Daskal, Ramat Efal (IL)

( * ) Notice: Subject to any disclaimer, the term of this patent is extended or adjusted under 35 U.S.C. 154(b) by 243 days.

(21) Appl. No.: 13/663,874

(22) Filed: Oct. 30, 2012

(65) Prior Publication Data
US 2013/0138336 A1 May 30, 2013

Related U.S. Application Data

(60) Provisional application No. 61/564,343, filed on Nov. 29, 2011.

(51) Int. Cl.
G01C 21/00 (2006.01)
G01S 5/02 (2010.01)
G01S 5/14 (2006.01)
G01C 21/20 (2006.01)
G01S 13/87 (2006.01)

(52) U.S. Cl.
CPC ............ *G01S 5/0226* (2013.01); *G01C 21/206* (2013.01); *G01S 5/14* (2013.01); *G01S 13/878* (2013.01)

(58) Field of Classification Search
USPC ......... 701/300, 400, 409, 412, 418, 446, 468, 701/540
See application file for complete search history.

(56) References Cited

U.S. PATENT DOCUMENTS

| 6,850,844 | B1 | 2/2005 | Walters | |
| 7,388,491 | B2 | 6/2008 | Chand | |
| 7,518,502 | B2 | 4/2009 | Austin | |
| 7,821,391 | B2 * | 10/2010 | Gupta et al. | 340/539.13 |
| 7,991,382 | B1 | 8/2011 | Gunasekara | |
| 8,659,429 | B1 * | 2/2014 | Wagner et al. | 340/572.1 |
| 2007/0171048 | A1 | 7/2007 | Shapiro | |
| 2007/0282565 | A1 * | 12/2007 | Bye et al. | 702/158 |
| 2008/0143482 | A1 | 6/2008 | Shoarinejad | |
| 2011/0162048 | A1 | 6/2011 | Bilbrey | |

FOREIGN PATENT DOCUMENTS

WO 2007/056333 5/2007

* cited by examiner

*Primary Examiner* — Kim T Nguyen
(74) *Attorney, Agent, or Firm* — Roach Brown McCarthy & Gruber, P.C.; Kevin D. McCarthy

(57) ABSTRACT

An apparatus and method for determining an Absolute Location of an indoor stationary object, the method comprising: receiving a distance between an indoor stationary object and one or more predetermined spots; determining a location of stationary object relative to one of the predetermined spots; receiving an Absolute Location of one of the predetermined spots; determining an Absolute Location of the stationary object; and storing the Absolute Location of the stationary object with description information of the stationary object.

15 Claims, 3 Drawing Sheets

METHOD AND APPARATUS FOR MAPPING BUILDINGS

FIELD OF THE INVENTION

The present invention relates to an apparatus and method for mapping stationary objects within buildings.

BACKGROUND OF THE INVENTION

Emergency services are often required to find their way within an unknown indoor environment, such as a large building. In some cases, for example when the building is on fire, visibility may be limited, which makes such navigation even harder.

The emergency forces may find it advantageous to have valid information about important stationary objects and related location within a building, such as a fire hydrant, a fuse box, a communication center, a stairwell, an elevator shaft, a safe, a fire resistant door, an emergency exit, a crash bar, a panic hardware, high-hazard items, safeguards, an emergency alarm system, an emergency light system, a fire detection system, an emergency tool or others.

However, using the internal floor plan of the building may prove useless, since internal walls are subject to change without notifying the authorities. Thus, in some cases floor plan information may prove harmful. For example, relying that a certain corridor leads to a required stationary object such as a fire hydrant, only to find out that the corridor has been blocked, may waste expensive time. In addition not all important stationary objects always appear on floor plans.

When attempting to map the exact location of a stationary object, known technologies such as GPS are of little use, since a GPS device located indoors is unable to communicate with satellites which are required for its operation.

There is thus a need for a method and apparatus that provide for mapping the exact location of stationary objects within a building.

SUMMARY OF THE INVENTION

One aspect of the invention relates to a method for determining an Absolute Location of a stationary object within a building, comprising: receiving a distance between a stationary object and one or more predetermined spots; determining a location of stationary object relative to the predetermined spots; receiving an Absolute Location of the predetermined spots; determining an Absolute Location of the stationary object; and storing the Absolute Location of the stationary object with description information of the stationary object. In some embodiments, the distance between the stationary object and each of the predetermined spots may be obtained using an RF or RFID system. In some embodiments, the Absolute Location of the predetermined spots may be obtained using a GPS device. In some embodiments, the stationary object may be located at an entry point to the building. In some embodiments, the stationary object may be located at an entry point to a floor of the building. In some embodiments, the steps may be repeated for two or more floors of the building. In some embodiments, the method may further comprise displaying a map of the building, the map comprising an indication of the location of the stationary object. In some embodiments, the predetermined spots may be three or more predetermined spots.

Another aspect of the invention relates to an apparatus for determining an Absolute Location of a stationary object within a building, comprising: a combined receiver and reader (CRR) unit, the CRR unit comprising: a distance receiving unit for receiving one or more distances between a stationary object and the CRR unit; an Absolute Location determination unit for determining an Absolute Location of the CRR unit; an integration module for combing the distance between the stationary object and the CRR unit to obtain a location of the stationary object relative to the CRR unit; an Absolute Location determination unit for combining the Absolute Location of the CRR unit and the location of the stationary object relative to the CRR unit into an Absolute Location of the stationary object; and a storage device for storing the Absolute Location of the stationary object and a description of the stationary object. In some embodiments, the distance receiving unit may be an RF or RFID reader. In some embodiments, the Absolute Location determination unit may be a Global Positioning System unit. In some embodiments, the stationary object may be located at an entry point to a floor of the building. In some embodiments, the apparatus may further comprise a user interface module for displaying a map of the building, the map comprising an indication of the location of the stationary object. In some embodiments, the integration module may combine three or more distances between the stationary object and three or more locations of one or more CRR units.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
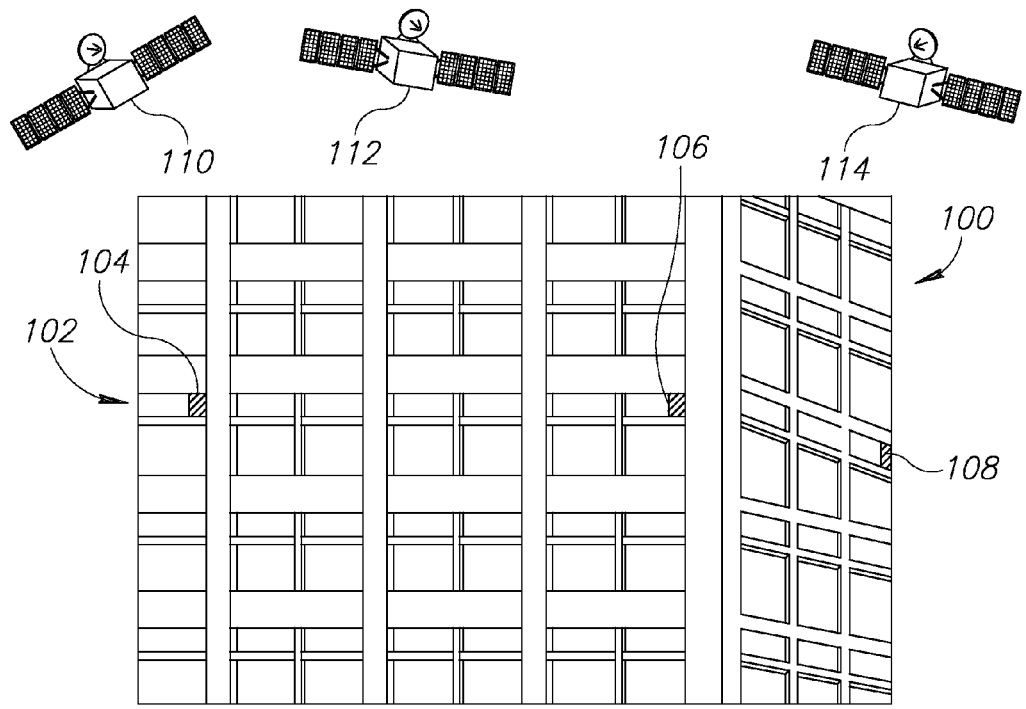
FIG. 1A shows a schematic illustration of a building with detectors placed on its envelope, in accordance with some exemplary embodiments of the invention.

The following description relates to indicating the location of stationary objects within buildings.

One technical problem handled by the disclosed method and apparatus relates to the need to obtain the exact location of stationary objects within buildings. In emergency situations, such as fire, emergency personnel may have to enter a building, in which they may have to head towards locations in which important indoor stationary objects are placed, such as a fire hydrant, a fuse box, an emergency exit, a crash bar, a panic hardware, high-hazard items, safeguards, an emergency alarm system, an emergency light system, a fire detection system, an emergency tool, a stairwell, an elevator or elevator shaft or the like. The stationary objects may not be immediately seen to a person entering the building since they may be located further inside, and in particular in situations in which visibility is limited, due to darkness, smoke, fire, or the like.

Obtaining the location information of stationary objects cannot generally be done using existing Global Positioning System (GPS) devices. A GPS device has to communicate with satellites, which cannot be done from within the building but only from its external part, such as out-facing windows. However, at least some of the stationary objects whose locations have to be indicated, may be located inside the building, and can thus not be navigated to using a GPS device.

One technical solution is the provisioning of an apparatus and method for obtaining the exact indoor location of multiple stationary objects within a building. Having the locations of a multiplicity of indoor stationary objects may enable the navigation to stationary objects without an external device such as a GPS device.

The apparatus and method for mapping the exact indoor location of a stationary object may use devices which combine external positioning capabilities with internal positioning capabilities. For example, in some embodiments, a device comprising GPS capabilities and RF or RFID reader capabilities, hereinafter combined reader and receiver (CRR) may be used.

In order to obtain the location of stationary objects within a building, one or more CRRs may be placed on the external envelope of the building, for example in the vicinity of an external window of the building, such that the device can obtain its position using the GPS unit.

In some embodiments, three CRRs may be placed in spots on the external envelope of the building in order to accurately obtain the distances between the stationary objects and each of the spots. In other embodiments, one CRR can be moved between the multiplicity of spots to obtain the required distances.

In some embodiments, an active RFID tag may be temporarily attached to each of the stationary objects whose location it is required to register. The active RFID tag comprises an on-board battery that constantly broadcasts or beacons its signal, which is received by each of the CRRs.

The distance between the CRR and the RFID tag that is attached to the stationary object can be determined by the CRR system. The CRR may include an interrogator, also known as signal strength indicator (RSSI), which consists of a circuit that measures the strength of an incoming signal, in order to estimate the distance from which the signal is sent. The CRR system may record the distance between each CRR and each of the stationary objects to which the RFID tag has been attached.

An integration unit may then receive the distances between each stationary object and the CRRs, and unequivocally determines the exact indoor location of the stationary object relatively to the CRRs, which may be referred to as a Relative Indoor Position (RIP). The RIP can be calculated or determined, for example, using any triangulation method.

This RIP of each stationary object may be combined with the exact outdoor location of each CRR, as may be obtained from its GPS unit, to provide the absolute location of the stationary object (hereafter referred as Absolute Location).

The output is a collection of data structures, wherein each data structure comprises the description information and Absolute Location for each required stationary object. The output may be represented and used in any required format or media, such as presented on a map or a floor plan of the building, as text file, as one or more tables within a database, or the like.

The information may further be integrated with any other information, such as the external boundary or envelope of the building, structural static elements such as pillars or windows, or the like. An identifier or serial number or any other type of description, referred to as description information may also be associated with each marked stationary object.

The description information or Absolute Location of the stationary objects may then be stored in a memory device for later retrieval.

It will be appreciated that the disclosure above relates to a single floor of a building, and that the process may be repeated for each floor of a multi-floor building. The CRRs may be placed at approximately the same height, for example by placing them at the same height above the floor level. The height of the stationary object may then be assumed to be the same as the height of the CRRs at the particular floor, which height may be obtained as part of the GPS information. Thus, a building may be associated with a multiplicity of collections of stationary objects location and description, each relating to a specific floor. The floor-related information item may be added to the description information record.

It will be further appreciated that not all stationary objects have to be located using the same positioning of the CRRs. Rather, for example in buildings whose floor area is too large for enabling reception from the same CRRs, one or more of the CRRs may be moved to a different spot for positioning some of the stationary objects. It will be also appreciated that the apparatus and method can use a single CRR may be is moved between several spots at or near the external part of the building, in order to obtain the distances required for determining the relative location of the stationary object (hereafter referred to as Relative Location).

The location of entry points to the building or to any of the floors may also be indicated and stored. In some embodiments, the absolute locations of all possible entry points, including suitable windows may be obtained and stored.

One technical effect of the disclosed subject matter is providing a method and apparatus for obtaining the exact Absolute Location of stationary objects within a building, such that a person, for example emergency personnel can efficiently navigate to the stationary object, and in particular in situations where visibility is limited.

Referring now to FIG. 1A showing a portion of a multi-floor building 100, in which each floor has a multiplicity of rooms and windows.

In order to map the stationary objects on a particular floor of building 100, such as floor 102, one or more detectors such as any of detectors 104, 108 and 112 are placed on the external envelope of building 100, for example on window sills or in close proximity to the windows, so that each detector can communicate with enough satellites such as satellites 110, 112 and 114, to obtain its absolute location, for example in world coordinates.

In some embodiments, detectors 104, 106 and 108 may be placed in spots which are as far away as possible from one another, so as to obtain increased accuracy in determining the location of each stationary object. If less than three detectors are used, the same detector should also be placed at such spots which are spaced apart from one another.

Figure 1B:
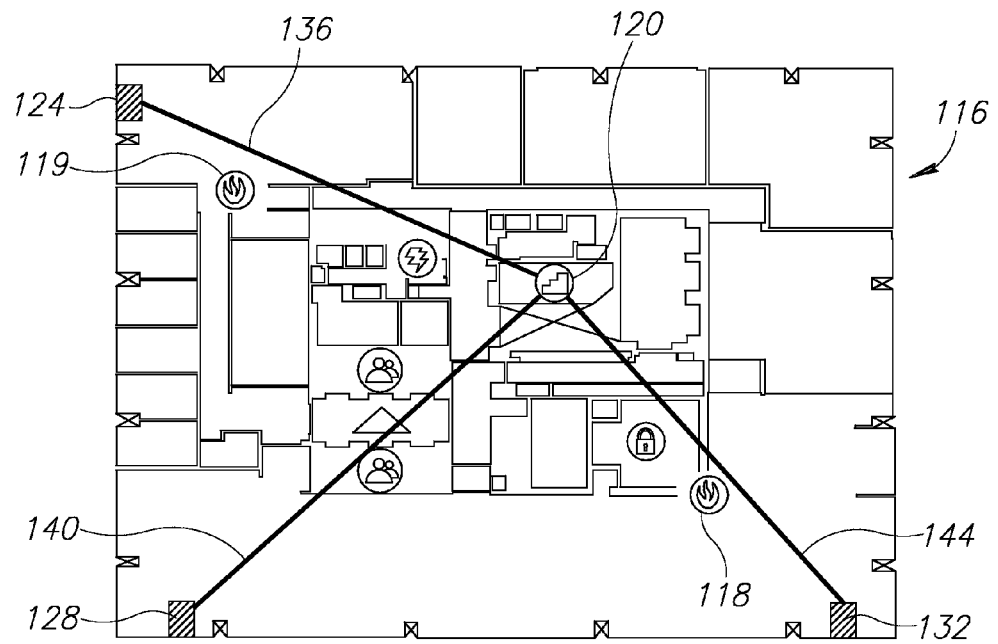
FIG. 1B shows a schematic illustration of a floor plan with stationary objects as detected by the detectors, in accordance with some exemplary embodiments of the invention.

Referring now to FIG. 1B showing a schematic illustration of a floor plan with stationary objects. The floor plan, generally referenced 116 comprises a number of stationary objects, such as anti-fire water supplies 118 and 119, staircase 120, and others.

The one or more detectors, such as detectors 104, 106 and 108 of FIG. 1A may be placed at spots 124, 128 and 132, such that their distances from staircase 120 are 136, 140 and 144, respectively.

Assuming that spots 124, 128 and 132 are at approximately the same height above ground level, the location of staircase 120 in respect to spots 124, 128 and 132 can be determined unequivocally using distances 136, 140 and 144, for example by triangulation.

The absolute locations of spots 124, 128 and 132 may then be obtained, for example using a GPS device, and then the Absolute Location of the stationary object such as staircase 120 can also be determined and stored.

Figure 2:
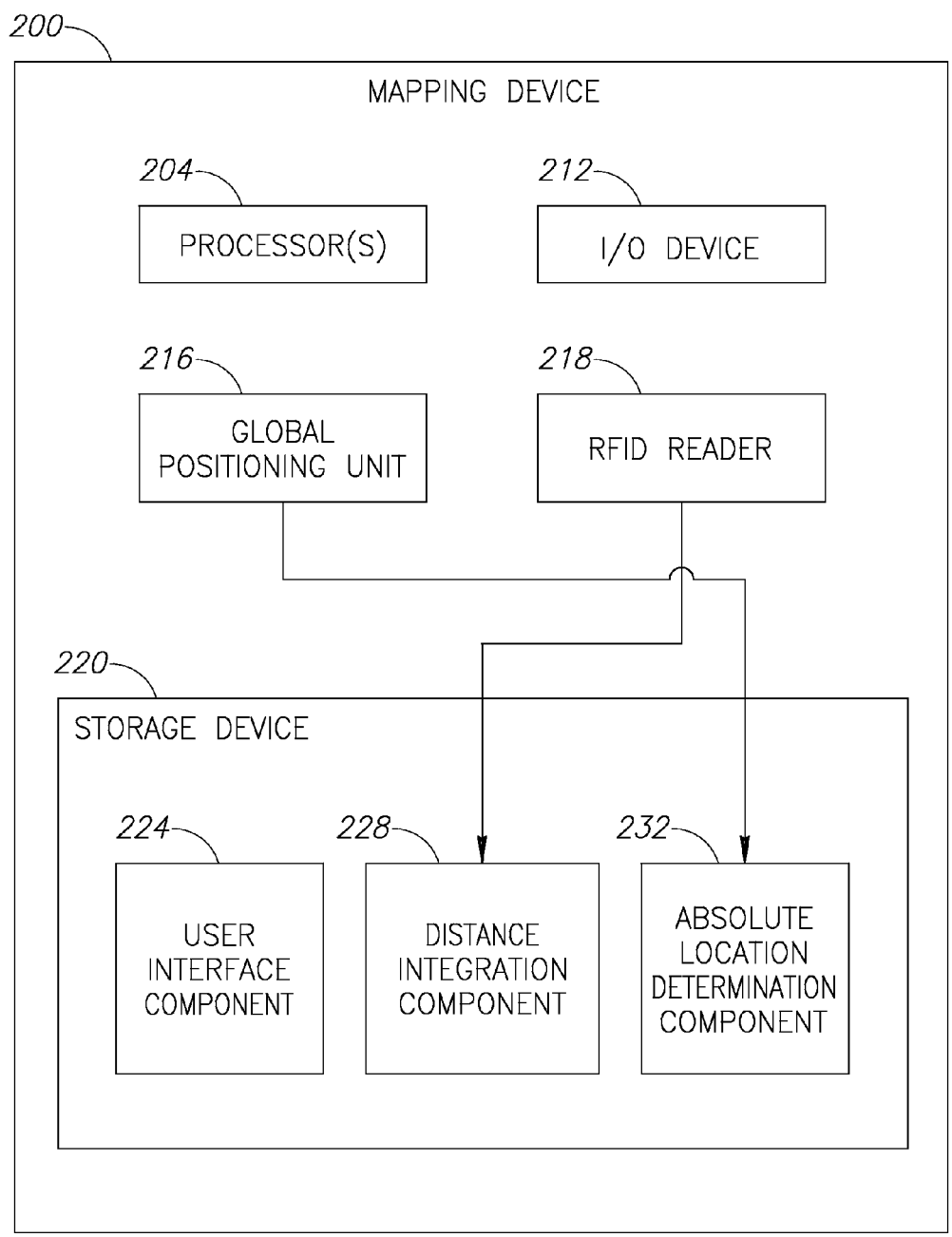
FIG. 2 is a schematic block diagram of a device for mapping the location of stationary objects within a building, in accordance with some exemplary embodiments of the invention.

Referring now to FIG. 2, showing a schematic block diagram of a CRR device for mapping the location of stationary objects within a building.

CRR device 200 may comprise one or more processors 204, wherein any of processors 204 may be a Central Processing Unit (CPU), a microprocessor, an electronic circuit, an Integrated Circuit (IC) or the like. Alternatively, CRR device 200 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 204 may be utilized to perform computations required by mapping device 200 or any of it subcomponents.

In some exemplary embodiments of the disclosed subject matter, CRR device 200 may comprise an input-output (I/O) device 212 such as a display, a keyboard, an input device or the like to interact with the system, to invoke the system and to receive results. It will however be appreciated that the system can operate without human operation and without I/O device 312. In other embodiments, mapping device 200 may comprise a touch display for a user to easily introduce input to the device, and for displaying visual and/or textual data to a user.

CRR device 200 may comprise a GPS unit 216 for receiving the Absolute Location of CRR device 200, for example by communicating with satellites, and an RF or RFID reader 218 for receiving signals from RF or RFID tags, and determining the distance between the tag and mapping device 200.

CRR device 200 may comprise or be in communication with one or more storage devices 220 for storing executable components, and which may also contain data obtained during execution of one or more components. Storage device 220 may be persistent or volatile. For example, storage device 220 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as a Flash device, memory stick, or the like. In some exemplary embodiments, storage device 220 may retain program code operative to cause any of processors 204 to perform acts associated with any of the steps shown in FIG. 3 below, for example determining distances or locations.

The components detailed below may be implemented as one or more sets of interrelated computer instructions, executed for example by any of processors 204 or by another processor. The components may be arranged as one or more executable files, dynamic libraries, static libraries, methods, functions, services, or the like, programmed in any programming language and under any computing environment.

In some embodiments the components loaded to storage device 220 may include a user interface component 224 utilized to receive input or provide output to and from the device, for example receiving from a user the description of a stationary object and identifying the readings associated with the stationary object, displaying data and results to a user, or the like.

The loaded components may further include a distance integration component 228 for combining readings, for example one or more readings indicating distances between a stationary object and one or more spots, into a location of the stationary object, relative to any one or more of the spots.

The loaded components may also include am Absolute Location determination component 232 for receiving one or more absolute locations of spots, and a location relative to any of the spots as determined by distance integration component 228, and determining the Absolute Location of the stationary object. For example, a received location may indicate where the CRR was located, and the Relative Location may indicate the location of the stationary object relative to that location, which may be combined to obtain the Absolute Location of the stationary object.

Figure 3:
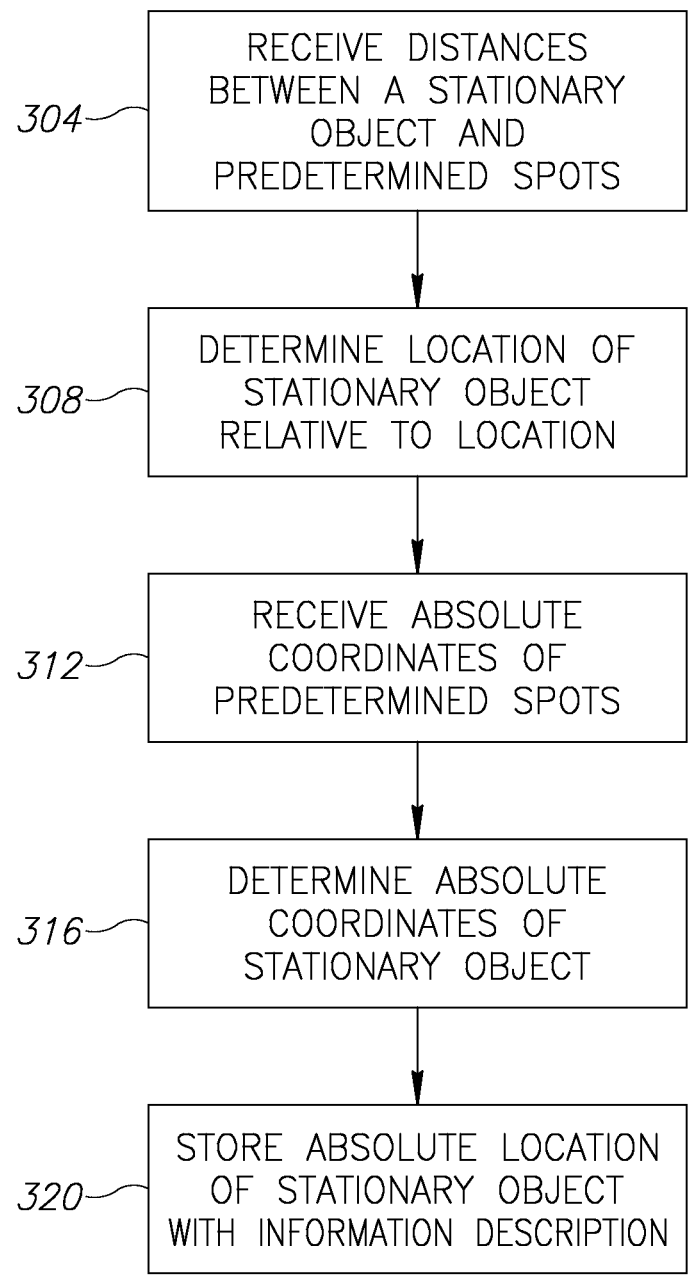
FIG. 3 is a flowchart of steps in a method for mapping the location of stationary objects within a building, in accordance with some exemplary embodiments of the invention.

Referring now to FIG. 3, showing a flowchart of steps in a method for obtaining and storing the Absolute Location of stationary objects within a building.

On step 304 the distances between a stationary object and predetermined spots are determined. The distances can be determined, for example, using an RF or RFID device, such as an active RFID device. The number of predetermined spots has to be such that the location of the stationary object relative to at least one of the predetermined spots can be determined unequivocally. For example, using three spots enables to determine the relative location using triangulation. However, if another number of spots may suffice using a known technology or a technology that will become known in the future, this number of spots can be used.

The distances may be obtained using more than one CRR at different spots, or fewer CRRs, wherein at least one of which is moved between different spots.

On step 308 the location of the stationary object relatively to the at least one of the predetermined spots is determined. The relative location may be expressed in offsets along any two axes, in offset and direction, or the like.

On step 312 the absolute location, for example in world coordinates, of the at least one predetermined spot is determined, for example using a GPS device.

On step 316 the Absolute Location, for example in world coordinates, of the stationary object is determined by combining the location of the at least one predetermined spot and the location of the stationary object relative to the predetermined spot.

On step 320 the Absolute Location of the stationary object is stored on a storage device, such as a non-transient storage device, for example storage device 220 of FIG. 2. The location of the stationary object may be stored together with description information related to the stationary object. The description information may include, for example a name or another identifier of the stationary object, the address of the building the stationary object is in, the floor of the object, or the like.

The process may be repeated for determining and storing the location and description of multiple objects. When determining the locations of multiple stationary objects within the same floor, sometimes the same predetermined spots may be used, so that step 312 of receiving the absolute coordinated of the predetermined spots has to be performed just once for a multiplicity of objects.

It will be appreciated that some of the steps can be performed in different order, for example, step 312 of receiving the absolute coordinates of the predetermined spots can be performed before receiving the distances between the predetermined spots and the stationary object.

In some embodiments, it may be required that the stationary objects include at least one stationary object indicated as an entry point to the floor, or to the building in case of one floor building, so that a user entering the building or the floor can navigate therein.

In some embodiments, the location of the stationary objects may be presented over a map of the building or floor. The map may also comprise information related to the external envelope of the building, obtained for example from pre-existing plans, aerial photograph or map, or the like.

The disclosed method and apparatus enable a user to obtain Absolute Locations of stationary objects and Relative Locations within buildings, such as a fire hydrant, a fuse box, an emergency exit, a crash bar, a panic hardware, high-hazard items, safeguards, an emergency alarm system, an emergency light system, a fire detection system, an emergency tool, a stairwell, an elevator or elevator shaft or the like. The method and apparatus provide for mapping the exact indoor location of a stationary object, from external positioning information of predetermined spots, combined with positioning information of the stationary object relative to the predetermined spots.

The obtained information can be displayed on a map, in a textual manner, vocally or in any other manner. The information can be used for navigating within a building in limited visibility conditions, such as darkness, smoke, fire or others.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step or component to the teachings without departing from the essential scope thereof. Therefore, it is intended that the disclosed subject matter not be limited to the particular embodiment disclosed as the best mode contemplated for carrying out this invention, but only by the claims that follow.

In the description and claims of the application, each of the words "comprise" "include" and "have", and forms thereof, are not necessarily limited to members in a list with which the words may be associated.

What is claimed is:

1. A method for determining an Absolute-Location of a stationary object within a building, comprising locating at least one combined receiver and reader (CRR) in a predetermined spot, the CRR configured to:
   receiving a signal from the stationary object and determining a distance between the stationary object and the at least one CRR based on the received signal;
   determining a Relative-Location of the stationary object relative to the at least one CRR from the received distance;
   receiving an Absolute-Location of the at least one CRR;
   determining the Absolute-Location of the stationary object from the Relative-Location of the stationary object and the Absolute-Location of the at least one CRR; and
   storing the Absolute-Location of the stationary object with description information of the stationary object,
   while communication between the stationary object and satellites is unavailable,
   wherein the Absolute-Location of the stationary object is unchanged and the stored Absolute-Location is used for mapping the indoor stationary object for navigation within the building.

2. The method of claim 1 wherein the distance between the stationary object and each of the at least one CRR is obtained using an RF or RFID system.

3. The method of claim 1 wherein the Absolute-Location of the at least one CRR is obtained using a GPS device.

4. The method of claim 1 wherein the stationary object is located at an entry point to the building.

5. The method of claim 1 wherein the stationary object is located at an entry point to a floor of the building.

6. The method of claim 1 wherein the steps of claim 1 are repeated for at least two floors of the building.

7. The method of claim 1 further comprising displaying a map of the building, the map comprising an indication of the Absolute-Location of the stationary object.

8. The method of claim 1 wherein the at least one CRR is at least three CRRs.

9. An apparatus for determining an Absolute-Location of a stationary object within a building, comprising:
   a combined receiver and reader (CRR) unit, the CRR unit comprising:
      a distance receiving unit for receiving a signal from the stationary object and determining a distance between the stationary object and the CRR unit based on the signal;
      an Absolute-Location determination unit for determining an Absolute-Location of the CRR unit; and
   an integration module for combing the distance between the stationary object and the CRR unit to obtain a Relative-Location of the stationary object relative to the CRR unit;
   an Absolute-Location determination unit for combining the Absolute-Location of the CRR unit and the Relative-Location of the stationary object relative to the CRR unit into the Absolute-Location of the stationary object; and
   a storage device for storing the Absolute Location of the stationary object and a description of the stationary object,
   wherein communication between the stationary object and satellites is unavailable, the Absolute-Location of the stationary object is unchanged and the stored Absolute-Location is used for mapping the indoor stationary object for navigation within the building.

10. The apparatus of claim 9 wherein the distance receiving unit is an RF or RFID reader.

11. The apparatus of claim 9 wherein the Absolute Location determination unit is a Global Positioning System unit.

12. The apparatus of claim 9 wherein the stationary object is located at an entry point to the building.

13. The apparatus of claim 9 wherein the stationary object is located at an entry point to a floor of the building.

14. The apparatus of claim 9 further comprising a user interface module for displaying a map of the building, the map comprising an indication of the location of the stationary object.

15. The apparatus of claim 9 wherein the integration module combines at least three distances between the stationary object and at least three locations of at least one CRR unit.

* * * * *